Aug. 27, 1929.  R. O. K. BUTTNER  1,726,256
ROD CIGARETTE MACHINE
Filed Nov. 7, 1925  2 Sheets-Sheet 1

Aug. 27, 1929.  R. O. K. BÜTTNER  1,726,256
ROD CIGARETTE MACHINE
Filed Nov. 7, 1925   2 Sheets-Sheet 2

Inventor
Robert Otto Kurt Büttner
By
Max W. Ordmann
Atty

Patented Aug. 27, 1929.

1,726,256

UNITED STATES PATENT OFFICE.

ROBERT OTTO KURT BUTTNER, OF DRESDEN, GERMANY, ASSIGNOR TO "UNIVER-SELLE" CIGARETTENMASCHINEN-FABRIK, J. C. MILLER & CO., OF DRESDEN, GERMANY.

ROD CIGARETTE MACHINE.

Application filed November 7, 1925, Serial No. 67,592, and in Germany November 29, 1924.

With modern very rapidly operating rod cigarette machines, cams or the like for controlling the cutter carriage can no more be used, but elements must be used, which move continuously in a circular path, in order to avoid jars and displacements of the moving parts.

The employment of a crank operated connecting rod for the transmission of movement to the cutter carriage is a draw-back, for while the crank revolves with uniform speed the rectilinear movement of the carriage will not be uniform, the same increasing to a certain maximum while the crank rotates from one of the dead points to 90 degrees of its circle and then decreasing while the crank passes from the 90 degrees to the second dead point. In order to overcome this draw-back and obtain a uniform rectilinear movement of the carriage the movement must be so controlled that during the first mentioned period the same will be correspondingly retarded and during the second period accelerated.

According to the present invention I accomplish this object by transmitting the motion to said carriage from the driven crank by means of a collapsible connecting rod which connecting rod is periodically collapsed and straightened by means of an arm operated from another crank rotated with a different speed but in unison with the driven main crank from a common source of power and in opposite direction, and which can be adjusted so that the mean speed of the carriage can be made to conform with the speed of the cigarette rod.

Figure 1:
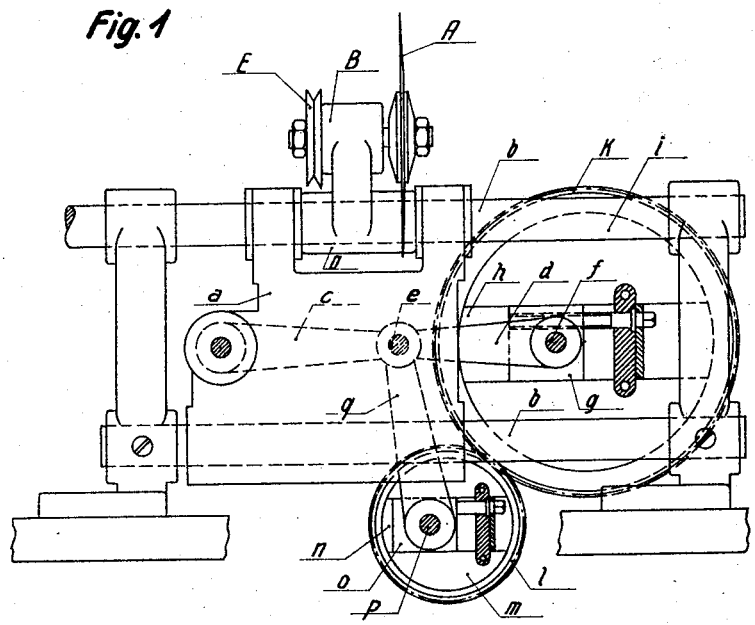
Figure 2:
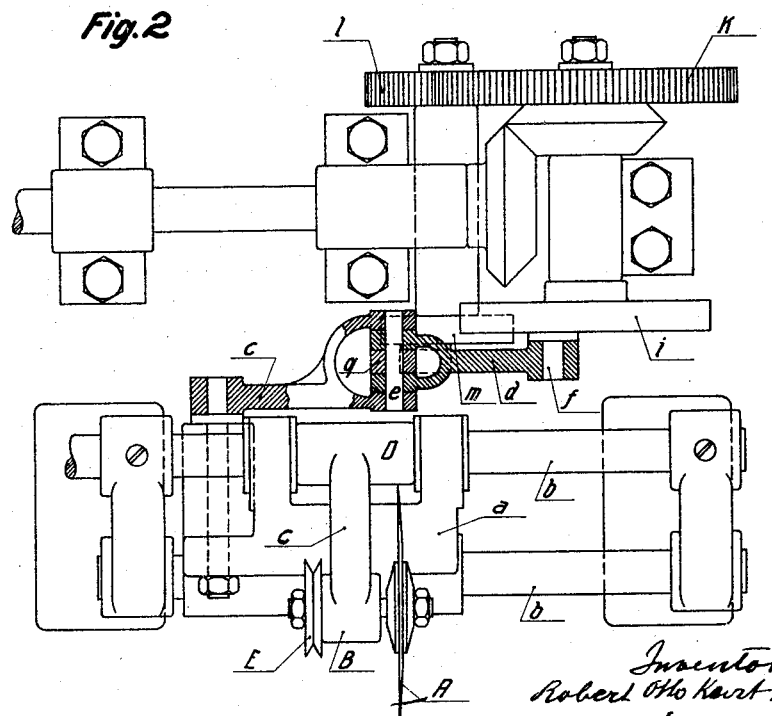
Figure 3:
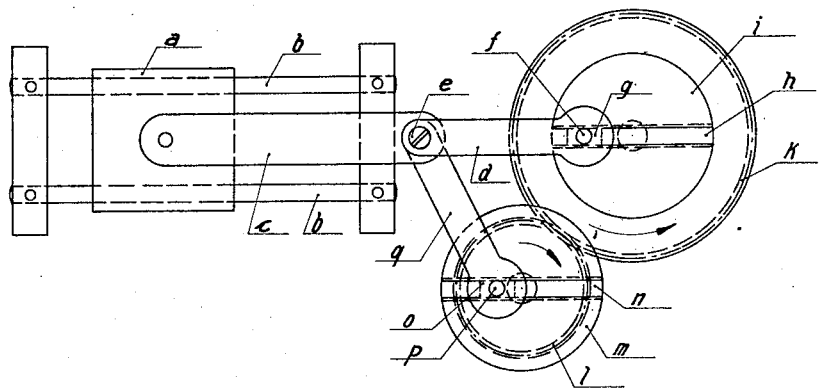
Figure 4:
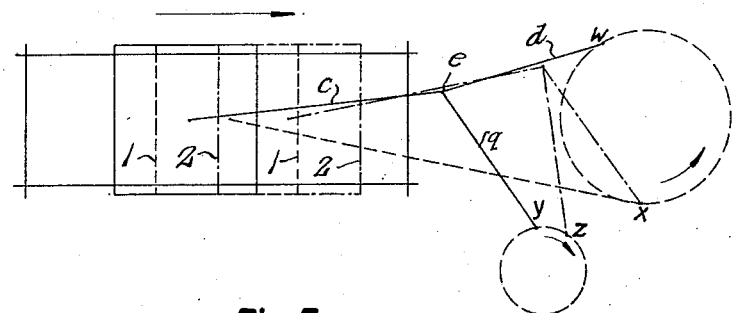
Figure 5:
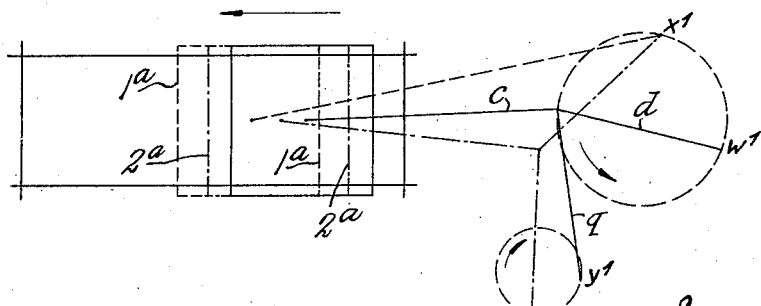

My invention will be more clearly understood by reference to the accompanying drawing in which similar characters denote corresponding parts and in which Fig. 1 is a front elevation of a cutter carriage with my new driving mechanism; Fig. 2 is a top plan view partly in horizontal cross-section;
Fig. 3 is a front elevation of the driving mechanism proper and Figs. 4 and 5 are diagrams of the same in two different positions.

The cutter carriage $a$ moves in well-known manner on parallel rods $b$ suitably mounted in a frame 10. The shaft of the circular cutter A is journaled in well-known manner in the bearing B formed in the outer end of a rock arm C, whose hub D is rotatably mounted on one of the guide rods $b$. The shaft of the cutter carries a pulley E driven by a cord from a driving pulley (not shown). When the cutter A is to perform a cutting operation, the rock lever C is rocked to cause the cutter A to cut through the cigarette rod. For the sake of clearness, the means for rocking the cutter in the manner described are omitted.

Pivotally connected to the cutter carriage $a$ with one end is an arm $c$ which by a pin $e$ is connected to one end of a second arm $d$ the other end of which is connected to a crank pin $f$. These two arms $c$ and $d$ constitute a collapsible connecting rod whereby motion is adapted to be transmitted from the crank pin $f$ to the cutter carriage $a$. The crank pin $f$ is carried by a slide $g$ which is mounted in a diametrically extending groove $h$ provided in a disk $i$. The latter is fixed to one end of a shaft the other end of which carries a cog wheel $k$. Fixed to one end of a shaft parallel to that of the cog wheel $k$ is a cog wheel $l$ which meshes with the cog wheel $k$. The other end of said second shaft has fixed to it a disk $m$ provided with a diametrically extending groove $n$ in which is slidably mounted a block $o$. This block is formed with a pin $p$ which constitutes the second crank pin and on which is mounted one end of an arm $q$. The other end of said arm $q$ engages the pin $e$ of the collapsible connecting rod $c$, $d$. The slides $g$ and $o$, can be adjusted in the corresponding grooves $h$ and $n$ to vary the speeds of rotation of the crank pins $f$ and $p$ respectively.

The crank pins $f$ and $p$ are adapted to revolve in opposite directions with different speeds. It will be seen that through the interaction of the crank pin $p$ through the medium of the arm $q$ the connecting rod $c$, $d$ will be collapsed or straightened at predetermined periods and to predetermined extents during the rotation of the crank pin $f$ so that the cutter carriage $a$ will be caused to move with a uniform mean speed, which by the adjustment of the slides $g$ and $o$ in the respective grooves $h$ and $n$ can be made to conform with that of the cigarette rod.

Assuming that the crank pin $f$ moves from $w$ toward $x$ and the auxiliary pivot $p$ moves from $y$ toward $z$ (Fig. 4). In this case, if it were not acted upon by the auxiliary rod $q$, the extended two part connecting rod $c$, $d$ would move the cutter carriage to the right into the dotted line position 1. But by the action of the auxiliary rod $q$, the main rod

$c, d$ will be collapsed and consequently the cutter carriage will be moved into the dotted line position 2, i. e. accelerated.

When the main crank pin $f$ moves from $w'$ to $x'$, as shown diagrammatically in Fig. 5, then again if the main connecting rod were not acted upon by the rod $q$, the cutter carriage would be displaced to the left into the dotted line position 1ª. But as the rod $q$, whose crank pin moves from $y'$ to $z'$, collapses the main rod $c, d$, the carriage will only move into the dotted line position 2ª and thus be retarded.

It is easily possible to so adjust the acceleration and retardation relative to one another, that thereby the uneven movements of the connecting rod will be adjusted, so that the carriage will be displaced with a uniform speed corresponding to the speed of the cigarette rod.

What I claim is:—

1. In a rod cigarette machine, the combination with the cutter carriage, of means for transmitting movement to said carriage and controlling said movement, comprising a crank operated main collapsible connecting rod and a crank operated auxiliary connecting rod engaging said collapsible connecting rod and adapted to periodically collapse and straighten said collapsible connecting rod to render the rectilinear movement of said carriage uniform.

2. In a rod cigarette machine, the combination with the cutter carriage, of means for transmitting movement to said carriage and controlling said movement, comprising a driven adjustable crank, a collapsible connecting rod between said crank and said carriage, a second driven adjustable crank and an auxiliary connecting rod between said collapsible connecting rod and said second crank and adapted to periodically collapse and straighten said collapsible connecting rod to render the rectilinear movement of said carriage uniform and its speed to conform with that of the cigarette rod.

3. In a rod cigarette machine, the combination with the cutter carriage, of two rotary members impelled in opposite directions, a collapsible means operatively connecting one of said rotary means to said carriage and a rigid member connecting said second rotary means to said collapsible means so as to periodically collapse and straighten said collapsible means to render the movement of said carriage uniform.

4. In a rod cigarette machine, the combination with the cutter carriage, of means for transmitting movement to said carriage and controlling said movement, comprising a driven disk adjustably bearing a crank pin, a connecting rod composed of two parts of which one engages said crank pin and the other is connected to said carriage, said parts being pivotally connected at the adjoining ends, a second disk driven in opposite direction to that of the first named disk and adjustably bearing a crank pin and an arm engaging the latter and connected to the pivotal joint of said parts, so that said connecting rod on the proper adjustment of said crank pins will be periodically and alternately collapsed and straightened to render the rectilinear movement of said carriage uniform and its speed to conform with that of the cigarette rod.

5. In a rod cigarette machine, the combination with the cutter carriage, of means for transmitting movement to said carriage and for controlling said movement, of a driven diametrically grooved disk, a crank member adjustably borne in the groove of said disk, a connecting rod composed of two parts of which one engages said crank member and the other is connected to said carriage, said two parts being pivotally connected at their adjoining ends, a second diametrically grooved disk driven in opposite direction to that of the first named disk, a crank member adjustable borne in said disk, an arm engaging said last named crank member and connected to the pivotal joint of said parts, so that said connecting rod on the proper adjustment of said crank members in said disks will be periodically and alternately collapsed and straightened to render the rectilinear movement of said carriage uniform and its speed to conform with that of the cigarette rod.

6. In a rod cigarette machine, the combination with the cutter carriage, of a driven crank pin, a collapsible connecting rod between said crank pin and said carriage, a second crank pin driven in opposite direction to and with different speed from that of the first named crank pin and means between said second crank pin and said collapsible connecting rod adapted to periodically collapse and straighten said connecting rod to render the rectilinear movement of said carriage uniform.

7. In a rod cigarette machine, the combination with the cutter carriage, of an adjustable driven crank pin, a collapsible connecting rod between said crank pin and said carriage, a second adjustable crank pin driven in opposite direction to and with different speed from that of the first crank pin and means between said second crank pin and said collapsible connecting rod adapted to periodically collapse and straighten said connecting rod to render the rectilinear movement of said carriage uniform and conform in speed with that of the cigarette rod.

In testimony whereof I affix my signature.

ROBERT OTTO KURT BUTTNER.

CERTIFICATE OF CORRECTION.

Patent No. 1,726,256. Granted August 27, 1929, to

ROBERT OTTO KURT BUTTNER.

It is hereby certified that the name of the assignee in the above numbered patent was erroneously written and printed "Universelle" Cigarettenmaschinen-Fabrik, J. C. Miller & Co.", whereas said name should have been written and printed "Universelle" Cigarettenmaschinen-Fabric, J. C. Muller & Co.", as shown by the records of assignments in this office; and that the said Letters Patent should be read with this correction therein that the same may conform to the record of the case in the Patent Office.

Signed and sealed this 5th day of November, A. D. 1929.

M. J. Moore,
Acting Commissioner of Patents.

(Seal)